United States Patent
Wang et al.

(10) Patent No.: US 9,162,321 B2
(45) Date of Patent: Oct. 20, 2015

(54) LASER WELDING METHOD AND LASER WELDING APPARATUS

(75) Inventors: Jing-bo Wang, Hyogo (JP); Hitoshi Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 597 days.

(21) Appl. No.: 13/576,019

(22) PCT Filed: Mar. 18, 2011

(86) PCT No.: PCT/JP2011/001602
§ 371 (c)(1),
(2), (4) Date: Jul. 30, 2012

(87) PCT Pub. No.: WO2011/118172
PCT Pub. Date: Sep. 29, 2011

(65) Prior Publication Data
US 2012/0298639 A1 Nov. 29, 2012

(30) Foreign Application Priority Data
Mar. 24, 2010 (JP) ................................. 2010-067609

(51) Int. Cl.
*B23K 26/20* (2014.01)
*B23K 9/12* (2006.01)
*B23K 9/133* (2006.01)
*B23K 28/02* (2014.01)
*B23K 9/173* (2006.01)
(Continued)

(52) U.S. Cl.
CPC . *B23K 28/02* (2013.01); *B23K 9/12* (2013.01); *B23K 9/124* (2013.01); *B23K 9/133* (2013.01); *B23K 9/173* (2013.01); *B23K 26/1429* (2013.01); *B23K 26/20* (2013.01); *B23K 26/422* (2013.01); *B23K 9/1336* (2013.01)

(58) Field of Classification Search
CPC .......... B23K 26/20; B23K 9/12; B23K 9/133; B23K 9/1336
USPC .................. 219/121.63, 121.64, 137.2, 137.7
See application file for complete search history.

(56) References Cited

U.S. PATENT DOCUMENTS 7,015,419 B2 * 3/2006 Hackl et al. .............. 219/130.21
7,107,118 B2 * 9/2006 Orozco et al. ................ 700/166
(Continued)

FOREIGN PATENT DOCUMENTS

CN 03134043 9/2003
CN 1526507 A 9/2004
(Continued)

OTHER PUBLICATIONS

Chinese Search Report for Application No. 201180015383.4, dated Mar. 26, 2014.
(Continued)

*Primary Examiner* — Samuel M Heinrich
(74) *Attorney, Agent, or Firm* — RatnerPrestia (57) ABSTRACT

A laser welding apparatus includes laser generator, arc generator, wire feeder, filler feeder, filler-feeding-abnormality detector, and controller. Controller stops welding immediately upon receiving a filler-feeding-abnormality signal from filler-feeding-abnormality detector. This can stop welding before the formation of a defective weld bead, and can also prevent the breakage of the welding apparatus.

37 Claims, 7 Drawing Sheets

(51) Int. Cl.
  *B23K 26/14* (2014.01)
  *B23K 26/30* (2014.01)

(56) References Cited

U.S. PATENT DOCUMENTS

| | | | | |
|---|---|---|---|---|
| 8,893,953 | B2 * | 11/2014 | Lee | 228/102 |
| 2004/0249495 | A1 * | 12/2004 | Orozco et al. | 700/166 |
| 2009/0212028 | A1 | 8/2009 | Watanabe et al. | |
| 2010/0326962 | A1 | 12/2010 | Calla et al. | |
| 2011/0132878 | A1 | 6/2011 | Wang et al. | |

FOREIGN PATENT DOCUMENTS

| | | | |
|---|---|---|---|
| CN | 101927414 | A | 12/2010 |
| JP | 56-131073 | A | 10/1981 |
| JP | 3-248775 | A | 11/1991 |
| JP | 5-31577 | A | 2/1993 |
| JP | 6-23549 | A | 2/1994 |
| JP | 7-47210 | B2 | 5/1995 |
| JP | 8-155669 | A | 6/1996 |
| JP | 2721571 | B2 | 11/1997 |
| JP | 10-6057 | A | 1/1998 |
| JP | 2000-158175 | A | 6/2000 |
| JP | 2001-179471 | A | 7/2001 |
| JP | 2002-178177 | A | 6/2002 |
| JP | 2002172464 | A * | 6/2002 |
| JP | 2002-192363 | A | 7/2002 |
| JP | 2003-205378 | A | 7/2003 |
| JP | 2006-159234 | A | 6/2006 |
| JP | 2009-178773 | A | 8/2009 |
| JP | 2009-195964 | A | 9/2009 |
| JP | 2010-46671 | A | 3/2010 |
| JP | 2010-064096 | A | 3/2010 |
| WO | WO 2010/021094 | A1 | 2/2010 |
| WO | WO 2010/021094 | A1 | 2/2010 |

OTHER PUBLICATIONS

International Search Report for Application No. PCT/JP2011/001602, dated Jun. 14, 2011, 3 pgs.

* cited by examiner

FIG. 9
PRIOR ART

LASER WELDING METHOD AND LASER WELDING APPARATUS

This Application is a U.S. National Phase Application of PCT International Application PCT/JP2011/001602.

TECHNICAL FIELD

The present invention relates to a method and apparatus for laser welding in which laser welding and arc welding are applied at the same time to an object to be welded.

BACKGROUND ART

When laser welding is applied at high speed to an object having a gap, part of the laser beam may leak into the gap, resulting in defective welding. To solve this problem, it has been proposed to feed a filler during laser welding, or to combine laser welding with consumable electrode arc welding. The former case requires extra laser energy to melt the filler, and the problem of cost reduction remains unsolved. The latter case has limited application because the rate of deposition of the wire used for arc welding cannot be adjusted independently of the welding current. To solve these problems, the inventors of the present invention have previously proposed a welding method in which a filler is fed to the welding position separately from the wire used for arc welding. As a result, the rate of deposition of the filler can be adjusted independently of the welding current.

Figure 8:
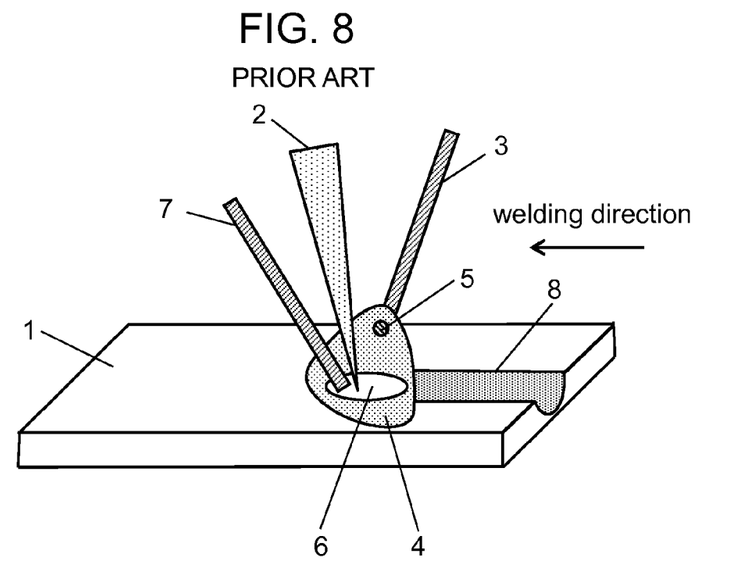
FIG. 8 is a schematic diagram showing a conventional method for laser welding proposed by the inventors of the present invention.

FIG. 8 is a schematic diagram showing the conventional method for laser welding proposed by the inventors of the present invention. In this method, laser beam 2 is applied to object 1 to be welded while feeding wire 3 to object 1. Arc 4 is created between wire 3 and object 1. Filler 7 is fed to the welding position of object 1. Laser beam 2 and arc 4 together melt wire 3 into droplets 5, which form molten weld pool 6 above object 1. Molten weld pool 6 solidifies to form bead 8.

Figure 9:
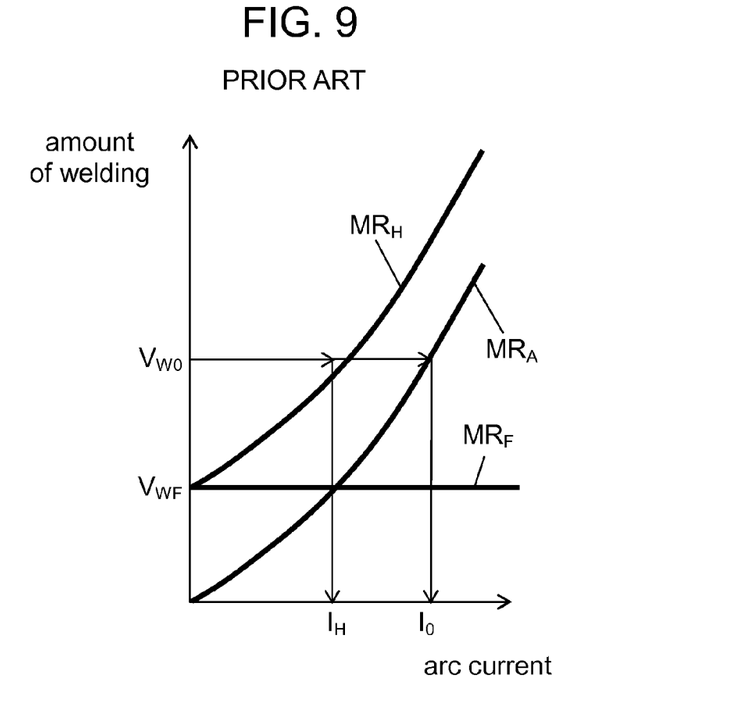
FIG. 9 is a schematic diagram showing the principle of the independent adjustment of the rate of deposition of the filler and the welding current in the conventional method for laser welding.

FIG. 9 is a schematic diagram showing the principle of the independent adjustment of the rate of deposition of the filler and the welding current in the conventional method proposed by the inventors of the present invention. A melting curve $MR_A$ shows the rate of deposition of the wire used for arc welding in a conventional hybrid laser-arc welding method. A melting curve $MR_F$ shows the rate of deposition of filler 7 in the conventional method proposed by the inventors of the present invention. In the conventional hybrid laser-arc welding method, when the target rate of deposition to be achieved is $V_{WO}$, the welding current needs to be $I_0$. In the conventional method proposed by the inventors of the present invention, on the other hand, filler 7 is fed at the rate of deposition $V_{WF}$ shown in the melting curve $MR_F$. Therefore, the rate of deposition of the filler and the wire is as shown in a melting curve $M_{RH}$, which is the sum of the melting curves $MR_A$ and $MR_F$.

In the conventional method proposed by the inventors of the present invention, the target rate of deposition $V_{WO}$ can be reached when the welding current is $I_H$. This means that adjusting the rate of deposition $V_{WF}$ of filler 7 can adjust the welding current $I_H$ independently. In other words, in order to achieve the rate of deposition $V_{WO}$ at the welding current $I_H$, the difference between the melting curves $M_{RA}$ and $MR_H$ at the rate of deposition $V_{WO}$ and at the welding current $I_H$ can be supplemented with the feeding of the filler.

In the actual welding process, the relation between the rate of deposition and the welding current is basically maintained along the melting curve $M_{RH}$, but various disturbing factors occur. For example, the tip of filler 7 may drop out of molten weld pool 6, and come into contact with the solid portion of object 1 to be welded, or may go into the bottom of molten weld pool 6, making it harder to melt filler 7. To prevent filler 7 from becoming harder to melt, it is necessary to automatically adjust the feeding of filler 7 or even to stop welding. The absence of any function or method to prevent these disturbing factors causes trouble. For example, molten weld pool 6 may be solidified with the tip of filler 7 at the bottom of molten weld pool 6. This may not only cause filler 7 to become non-removable but also damage the filler feeder.

In view of the conventional problems, it is an object of the present invention to provide a method and apparatus for laser welding in which a filler is fed to a welding position, and welding is stopped immediately upon detection of an abnormality in the feeding of the filler.

CITATION LIST

Patent Literature

PTL 1: WO2010021094

SUMMARY OF THE INVENTION

The present invention is directed to provide a method and apparatus for laser welding in which a wire is fed to the welding position of an object to be welded while a laser beam is applied to the welding position, and at the same time, an arc is created between the wire and the welding position. If an abnormality is detected in the feeding of the filler to the welding position, welding is immediately stopped.

In order to solve the above-described problems, the method of the present invention for laser welding in which a filler is fed to the welding position of an object to be welded while a laser beam is applied to the welding position includes: a detecting step to detect an abnormality in the feeding of the filler; and a speed reducing step to reduce the feed speed of the filler by a predetermined level immediately after the detecting step.

This method can stop welding before the formation of a weld bead having an undesired shape, thus providing excellent welding performance and also preventing the breakage of the welding apparatus.

The method of the present invention for laser welding in which a filler is fed to the welding position of an object to be welded while a laser beam is applied to the welding position may alternatively include: a detecting step to detect an abnormality in the feeding of the filler; a reverse-direction feeding step to feed a predetermined amount of the filler in a reverse direction immediately after the detecting step; and a forward-direction feeding step to feed the filler in a forward direction after the reverse-direction feeding step.

This method can stop welding before the formation of a defective weld bead, thus providing excellent welding performance and also preventing the breakage of the welding apparatus.

The method of the present invention for laser welding in which a filler is fed to the welding position of an object to be welded while a laser beam is applied to the welding position may alternatively include: a detecting step to detect an abnormality in the feeding of the filler; a reverse-direction feeding step to feed a predetermined amount of the filler in a reverse direction immediately after the detecting step; and a low-speed feeding step to feed the filler at a speed reduced by a predetermined level.

This method can stop welding before the formation of a defective weld bead, thus providing excellent welding performance and also preventing the breakage of the welding apparatus.

The method of the present invention for laser welding in which a filler is fed to the welding position of an object to be welded while a laser beam is applied to the welding position may alternatively include: a detecting step to detect an abnormality in the feeding of the filler; and a filler-feed stopping step to stop the feeding of the filler immediately after the detecting step.

This method can stop welding before the formation of a defective weld bead, thus providing excellent welding performance and also preventing the breakage of the welding apparatus.

The method of the present invention for laser welding in which a filler is fed to the welding position of an object to be welded while a laser beam is applied to the welding position may alternatively include: a detecting step to detect an abnormality in the feeding of the filler; and a welding stopping step to stop welding immediately after the detecting step.

This method can stop welding before the formation of a defective weld bead, thus providing excellent welding performance and also preventing the breakage of the welding apparatus.

The laser welding apparatus of the present invention includes: a laser generator to apply a laser beam to the welding position of an object to be welded; a wire feeder to feed a wire through a torch to the welding position; an arc generator to control the wire feeder and supply electric power for creating an arc between the wire and the object to be welded; a filler feeder to feed a filler through a torch to the welding position; a filler-feeding-abnormality detector to detect an abnormality in the feeding of the filler performed by the filler feeder; and a controller to receive an output signal of the filler-feeding-abnormality detector and control the laser generator, the arc generator, and the filler feeder. The controller reduces the feed speed of the filler by a predetermined level immediately upon receiving a filler-feeding-abnormality signal from the filler-feeding-abnormality detector.

This structure can stop welding before the formation of a weld bead having an undesired shape, thus providing excellent welding performance and also preventing the breakage of the welding apparatus.

As described hereinbefore, in the method and apparatus for laser welding of the present invention, a wire is fed to the welding position of an object to be welded while a laser beam is applied to the welding position, and at the same time, an arc is created between the wire and the welding position. If an abnormality is detected in the feeding of the filler to the welding position, welding is immediately stopped. This can stop welding before the formation of a defective weld bead, and also prevent the breakage of the welding apparatus.

DESCRIPTION OF EMBODIMENTS

Embodiments of the present invention will be described as follows with reference to the accompanied drawings. In the second and third embodiments, like components are labeled with like reference numerals with respect to the preceding embodiments, and hence, the description thereof will be omitted.

First Exemplary Embodiment

Figure 1:
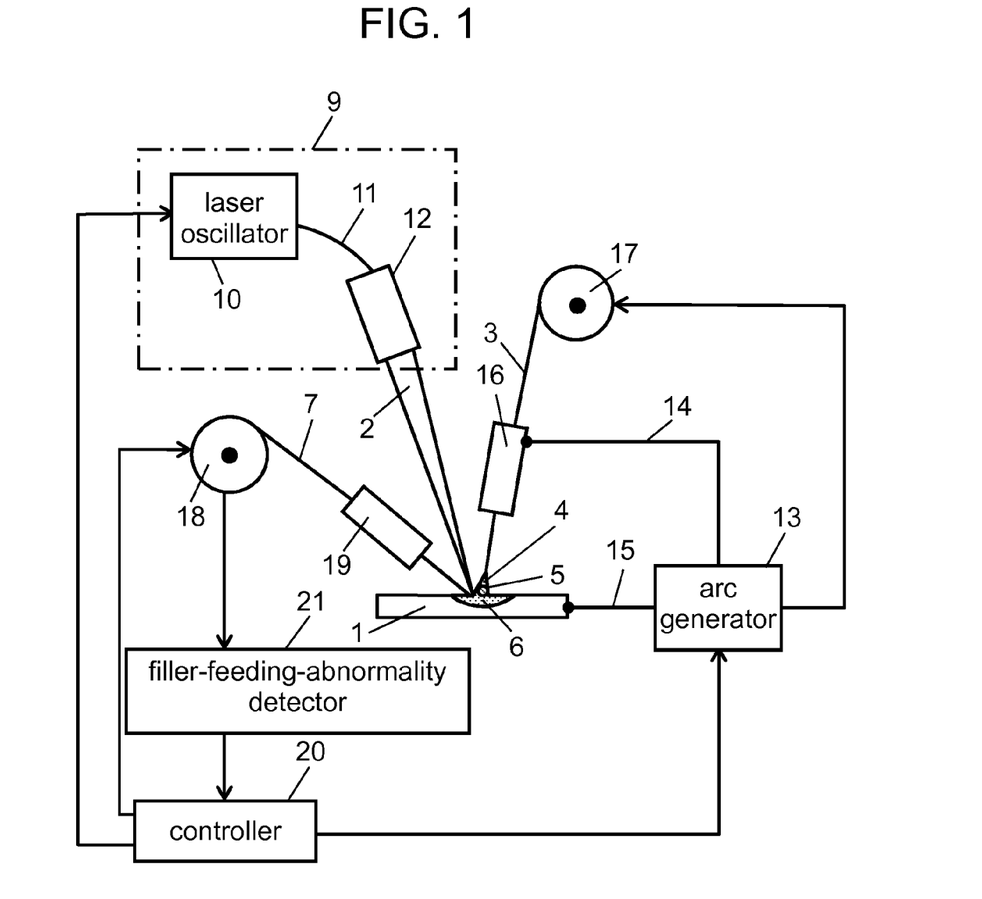
FIG. 1 is a schematic diagram of a laser welding apparatus according to a first exemplary embodiment of the present invention.

FIG. 1 is a schematic diagram of a laser welding apparatus according to a first exemplary embodiment of the present invention. As shown in FIG. 1, the laser welding apparatus includes laser generator 9, arc generator 13, wire feeder 17, filler feeder 18, filler-feeding-abnormality detector 21, and controller 20. Laser generator 9 includes laser oscillator 10, laser transmitter 11, and light collection optical system 12. Arc generator 13 is connected via cable 14 to torch 16 thorough which wire 3 is fed. Arc generator 13 is further connected via cable 15 to object 1 to be welded so as to supply electric power to create arc 4 between wire 3 and object 1. Wire feeder 17 feeds wire 3 to object 1 through torch 16. Filler feeder 18 feeds filler 7 to the welding position of object 1 through torch 19. Filler feeding abnormality detector 21 detects an abnormality in the feeding of filler 7 from filler feeder 18. Controller 20 receives a signal from filler-feeding-abnormality detector 21, and controls laser generator 9, arc generator 13, and filler feeder 18.

Laser generator 9 applies laser beam 2, which has been collected by light collection optical system 12, to object 1. Light collection optical system 12 may be composed of one or more lenses. Laser transmitter 11 may be an optical fiber, or a transmission system composed of lenses. Laser oscillator 10 can freely control the output value and the timing to output the value using an unillustrated external control device. At the start of the welding process, arc generator 13 controls wire feeder 17 to feed wire 3 toward object 1 to be welded so as to create arc 4 between wire 3 and object 1. At the end of the welding process, arc generator 13 controls wire feeder 17 to stop feeding wire 3 so as to stop arc 4. Filler feeder 18 and wire feeder 17 can freely control their feed speed, and the start/stop of the feeding by using an external control device. Controller 20 may be a computer, or may alternatively be a component, device, or equipment having a calculation function like a computer, or a combination thereof. Alternatively, controller 20 may be a robot. In this case, although not described in detail, it is possible to fix light collection optical system 12, torch 16, and torch 19 to the manipulator of the robot. Although not illustrated, controller 20 can output signals to an external unit, thereby controlling the timing of starting the welding process (starting the arc and laser), the feed speed of wire 3 or filler 7, or the timing of changing the speed.

The following is a description of the operation of the laser welding apparatus according to the first exemplary embodiment. As shown in FIG. 1, until receiving a filler-feeding-abnormality signal from filler-feeding-abnormality detector 21, controller 20 controls laser generator 9, arc generator 13, and filler feeder 18 so as to perform hybrid laser-arc welding. Upon receiving the filler-feeding-abnormality signal from filler-feeding-abnormality detector 21, controller 20 stops the feeding of filler 7. At the same time, the controller controls laser generator 9 and arc generator 13 to stop laser welding.

As described above, according to the laser welding apparatus of the first exemplary embodiment, a wire is fed to the welding position of an object to be welded while a laser beam is applied to the welding position, and at the same time, an arc is created between the wire and the welding position. If an abnormality is detected in the feeding of the filler to the welding position, welding is immediately stopped. This can stop welding before the formation of a defective weld bead, and also prevent the breakage of the welding apparatus.

In the laser welding apparatus of the first exemplary embodiment, filler-feeding-abnormality detector 21 receives a drive current IM of a filler-feed motor of filler feeder 18. Filler feeding abnormality detector 21 may be configured to output the filler-feeding-abnormality signal when the current IM exceeds a predetermined reference value IM0, or when the differential of the current IM exceeds a predetermined reference value IMd0. The configuration of the laser welding apparatus will be briefly described as follows with reference to FIGS. 2 and 3.

Figure 2:
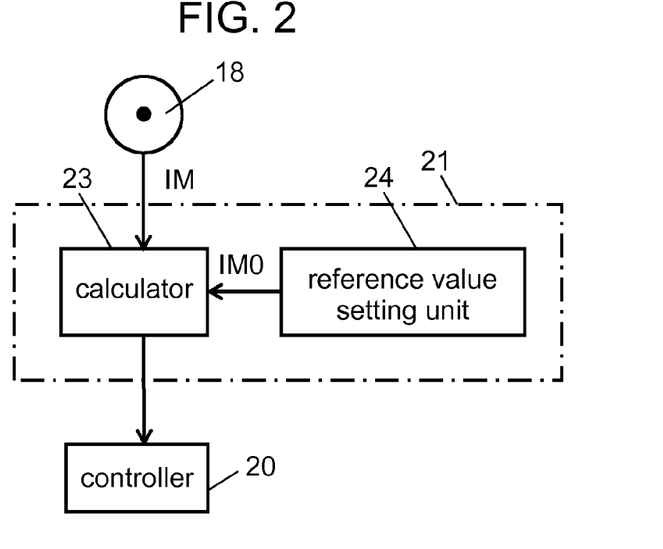
FIG. 2 is a schematic diagram of an example of filler-feeding-abnormality detector in the laser welding apparatus according to the first exemplary embodiment.

FIG. 2 is a schematic diagram of an example of filler-feeding-abnormality detector 21 in the laser welding apparatus according to the first exemplary embodiment. Filler feeding abnormality detector 21 includes calculator 23 and reference value setting unit 24. At the time of welding, calculator 23 receives the drive current IM of the filler-feed motor of filler feeder 18, and the reference value IM0 set by reference value setting unit 24, and performs arithmetic processing. Calculator 23 outputs the filler-feeding-abnormality signal to controller 20 only when the drive current IM exceeds the reference value IM0.

Figure 3:
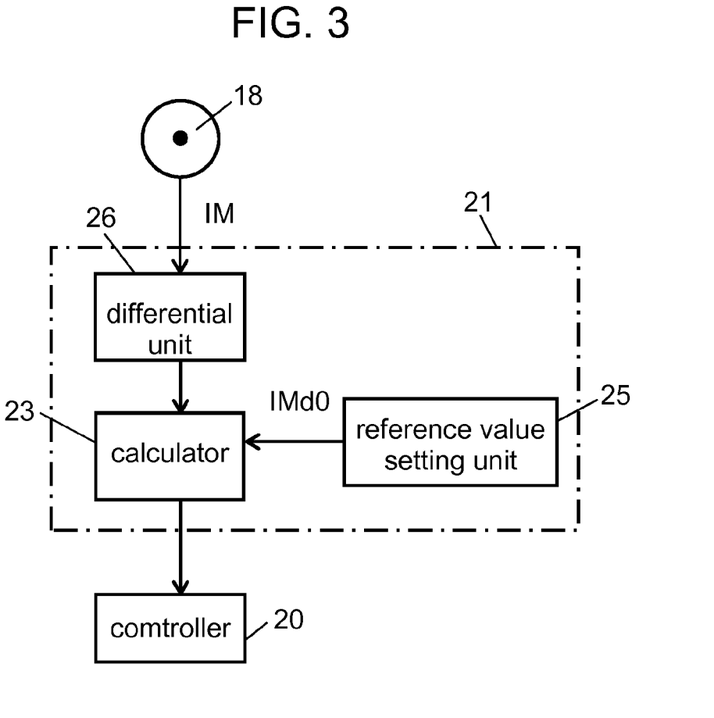
FIG. 3 is a schematic diagram of another example of the filler-feeding-abnormality detector in the laser welding apparatus according to the first exemplary embodiment.

FIG. 3 is a schematic diagram of another example of filler-feeding-abnormality detector 21 in the laser welding apparatus according to the first exemplary embodiment. Filler feeding abnormality detector 21 includes differential unit 26, calculator 23, and reference value setting unit 25. At the time of welding, differential unit 26 receives the drive current IM of the filler-feed motor of filler feeder 18, determines a differential dIM/dt, and outputs the differential to calculator 23. Calculator 23 receives the differential signal dIM/dt and the reference value IMd0 set by reference value setting unit 25, and performs arithmetic processing. Calculator 23 outputs the filler-feeding-abnormality signal to controller 20 only when the differential signal dIM/dt exceeds the reference value IMd0. The reference value IM0 or IMd0 can be set according to the feed speed of the filler in the normal condition. It goes without saying, however, that the value may be previously determined by welding experiments.

In the laser welding apparatus according to the first exemplary embodiment, filler-feeding-abnormality detector 21 receives an output signal FT of a force sensor to detect the load applied to torch 19. The force sensor is attached to either torch 19 or a fastener for fixing torch 19. Filler feeding abnormality detector 21 can be configured to output the filler-feeding-abnormality signal when the output signal FT exceeds a predetermined reference value FT0, or when the differential of the output signal FT exceeds a predetermined reference value FTd0. In filler-feeding-abnormality detector 21 shown in FIGS. 2 and 3, calculator 23 and differential unit 26 receive the output signal FT of the force sensor, instead of the drive current IM of the filler-feed motor of filler feeder 18. The force sensor is attached to torch 19, and detects the load applied to torch 19. The operation of filler-feeding-abnormality detector 21 has been described above with reference to FIGS. 2 and 3, and hence will not be repeated here.

In the laser welding apparatus according to the first exemplary embodiment shown in FIGS. 2 and 3, filler-feeding-abnormality detector 21 is configured to detect either the drive current of the filler-feed motor of filler feeder 18 or the load applied to torch 19. At the start of the welding process, if filler 7 comes into contact with the surface of object 1 to be welded, this may change the drive current of the filler-feed motor or the load applied to torch 19 even if the arc is started normally. Therefore, in the first exemplary embodiment, it is necessary to exclude the filler-feeding-abnormality signal that is generated by a change either in the drive current of the filler-feed motor or in the load applied to torch 19 when the arc is started normally. The drive current of the filler-feed motor also changes when the feed speed of filler 7 is changed. Therefore, it is also necessary to exclude the filler-feeding-abnormality signal that is generated by a change in the drive current of the filler-feed motor.

Further another example of filler-feeding-abnormality detector 21 using the drive current IM of the filler-feed motor will be described as follows with reference to FIG. 4, which is different from the example shown in FIG. 2. Like components are labeled with like reference numerals with respect to the example shown in FIG. 2 because they have the same structure, operation, and effects. The following description mainly concerns differences from the example shown in FIG. 2.

Figure 4:
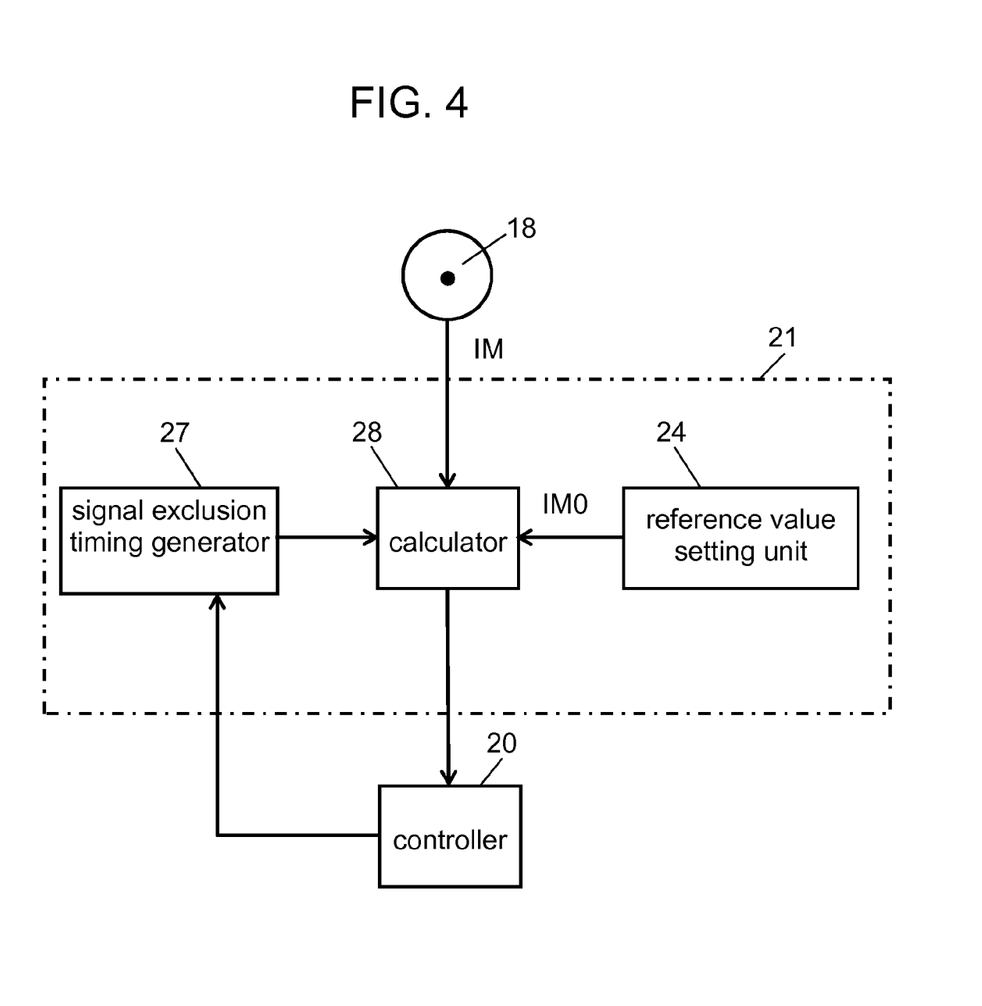
FIG. 4 is a schematic diagram of further another example of the filler-feeding-abnormality detector according to the first exemplary embodiment.

FIG. 4 is a schematic diagram of further another example of laser filler-feeding-abnormality detector 21 of the welding apparatus according to the first exemplary embodiment. Filler feeding abnormality detector 21 includes reference value setting unit 24, signal exclusion timing generator 27, and calculator 28. Calculator 28 receives the drive current IM of the filler-feed motor of filler feeder 18, the reference value signal IM0, and the output signal of signal exclusion timing generator 27, which receives the output signal of controller 20. At the start of the welding process or in order to change the feed speed of filler 7, controller 20 outputs a signal to signal exclusion timing generator 27, the signal indicating the timing to start welding or to change the feed speed. Upon receiving the signal from controller 20, signal exclusion timing generator 27 starts to output an exclusion signal to calculator 28, and continues to output the signal only for a predetermined period. Calculator 28 does not output the filler-feeding-abnormality signal to controller 20 only while the exclusion signal is being outputted even if the drive current IM of the filler-feed motor exceeds the reference value IM0 of reference value setting unit 24. It is possible to make signal exclusion timing generator 27 and calculator 28 in filler-feeding-abnormality detector 21 shown in FIG. 3 operate in the same manner as those in filler-feeding-abnormality detector 21 shown in FIG. 4, but the detailed description will be omitted.

Thus, the method of the present invention for laser welding in which a filler is fed to the welding position of an object to be welded while a laser beam is applied to the welding position includes: a detecting step to detect an abnormality in the feeding of the filler; and a speed reducing step to reduce a feed speed of the filler by a predetermined level immediately after the detecting step.

This method can stop welding before the formation of a weld bead having an undesired shape, thus providing excellent welding performance and also preventing the breakage of the welding apparatus.

The method for laser welding may alternatively include: a detecting step to detect an abnormality in the feeding of the filler; and a filler-feed stopping step to stop the feeding of the filler immediately after the detecting step.

This method can stop welding before the formation of a defective weld bead, thus providing excellent welding performance and also preventing the breakage of the welding apparatus.

The method for laser welding may alternatively include: a detecting step to detect an abnormality in the feeding of the filler; and a welding stopping step to stop welding immediately after the detecting step.

This method can stop welding before the formation of a defective weld bead, thus providing excellent welding performance and also preventing the breakage of the welding apparatus.

It is possible to dispose the filler in such a manner as to be exposed directly to the laser beam. This allows high-speed laser welding even if the object to be welded has a gap.

It is also possible to dispose the filler in such a manner as to be in contact with the object to be welded and to be exposed directly to the laser beam. This allows high-speed laser welding even if the object to be welded has a gap.

The laser welding apparatus of the present invention includes a laser generator, a wire feeder, an arc generator, a filler feeder, a filler-feeding-abnormality detector, and a controller. The controller reduces the feed speed of the filler by a predetermined level immediately upon receiving a filler-feeding-abnormality signal from the filler-feeding-abnormality detector. The laser generator applies a laser beam to the welding position of the object to be welded. The wire feeder feeds a wire through a torch to the welding position. The arc generator controls the wire feeder and supplies electric power for creating an arc between the wire and the object to be welded. The filler feeder feeds a filler through a torch to the welding position. The filler-feeding-abnormality detector detects an filler-feeding-abnormality timing of the filler feeder. The controller receives the output signal of the filler-feeding-abnormality detector and controls the laser generator, the arc generator, and the filler feeder.

This structure can stop welding before the formation of a weld bead having an undesired shape, thus providing excellent welding performance and also preventing the breakage of the welding apparatus.

The controller may stop the feeding of the filler immediately upon receiving the filler-feeding-abnormality signal from the filler-feeding-abnormality detector.

This structure can stop welding before the formation of a defective weld bead, thus providing excellent welding performance and also preventing the breakage of the welding apparatus.

The controller may stop welding immediately upon receiving the filler-feeding-abnormality signal from the filler-feeding-abnormality detector.

This structure can stop welding before the formation of a defective weld bead, thus providing excellent welding performance and also preventing the breakage of the welding apparatus.

The torch used to feed the filler may be the same type as the torch used to feed the wire. Using the same components reduces the cost of the laser welding apparatus.

The controller may stop the feeding of the filler immediately upon receiving the filler-feeding-abnormality signal from the filler-feeding-abnormality detector.

This structure can stop welding before the formation of a defective weld bead, thus providing excellent welding performance and also preventing the breakage of the welding apparatus.

The filler-feeding-abnormality detector may receive a drive current of a filler-feed motor of the filler feeder, and may output the filler-feeding-abnormality signal to the controller when the drive current exceeds a predetermined reference value.

This structure can stop welding before the formation of a defective weld bead, thus providing excellent welding performance and also preventing the breakage of the welding apparatus.

The filler-feeding-abnormality detector may receive a drive current of a filler-feed motor of the filler feeder, and may output the filler-feeding-abnormality signal to the controller when the differential of the drive current exceeds a reference value.

This structure can stop welding before the formation of a defective weld bead, thus providing excellent welding performance and also preventing the breakage of the welding apparatus.

The filler-feeding-abnormality detector may receive the output signal of a force sensor, and may output the filler-feeding-abnormality signal to the controller when the output signal exceeds a reference value. The force sensor is attached to either the torch used to feed the filler or a fastener for fixing the torch, and detects the load applied to the torch.

This structure can stop welding before the formation of a defective weld bead, thus providing excellent welding performance and also preventing the breakage of the welding apparatus.

The filler-feeding-abnormality detector may receive an output signal of a force sensor, and may output the wire-feeding-abnormality signal to the controller when a differential of the output signal exceeds a reference value. The force sensor is attached to either the torch used to feed the filler or a fastener for fixing the torch, and detects a load applied to the torch.

This structure can stop welding before the formation of a defective weld bead, thus providing excellent welding performance and also preventing the breakage of the welding apparatus.

The filler-feeding-abnormality detector may be configured not to output the abnormality signal only for a predetermined period after welding is started.

This structure can exclude the abnormality signal that is generated by a change in the drive current when the arc is started normally.

The filler-feeding-abnormality detector does not output the abnormality signal only for a predetermined period from a time point at which the feed speed of the filler is adjusted.

This structure can exclude the abnormality signal that is generated by a change in the drive current when the feed speed is changed.

The filler may be disposed so as to be exposed directly to the laser beam. This allows high-speed laser welding even if the object to be welded has a gap.

The filler may be disposed so as to be in contact with the object to be welded and also to be exposed directly to the laser beam. This allows high-speed laser welding even if the object to be welded has a gap.

Second Exemplary Embodiment

Figure 5:
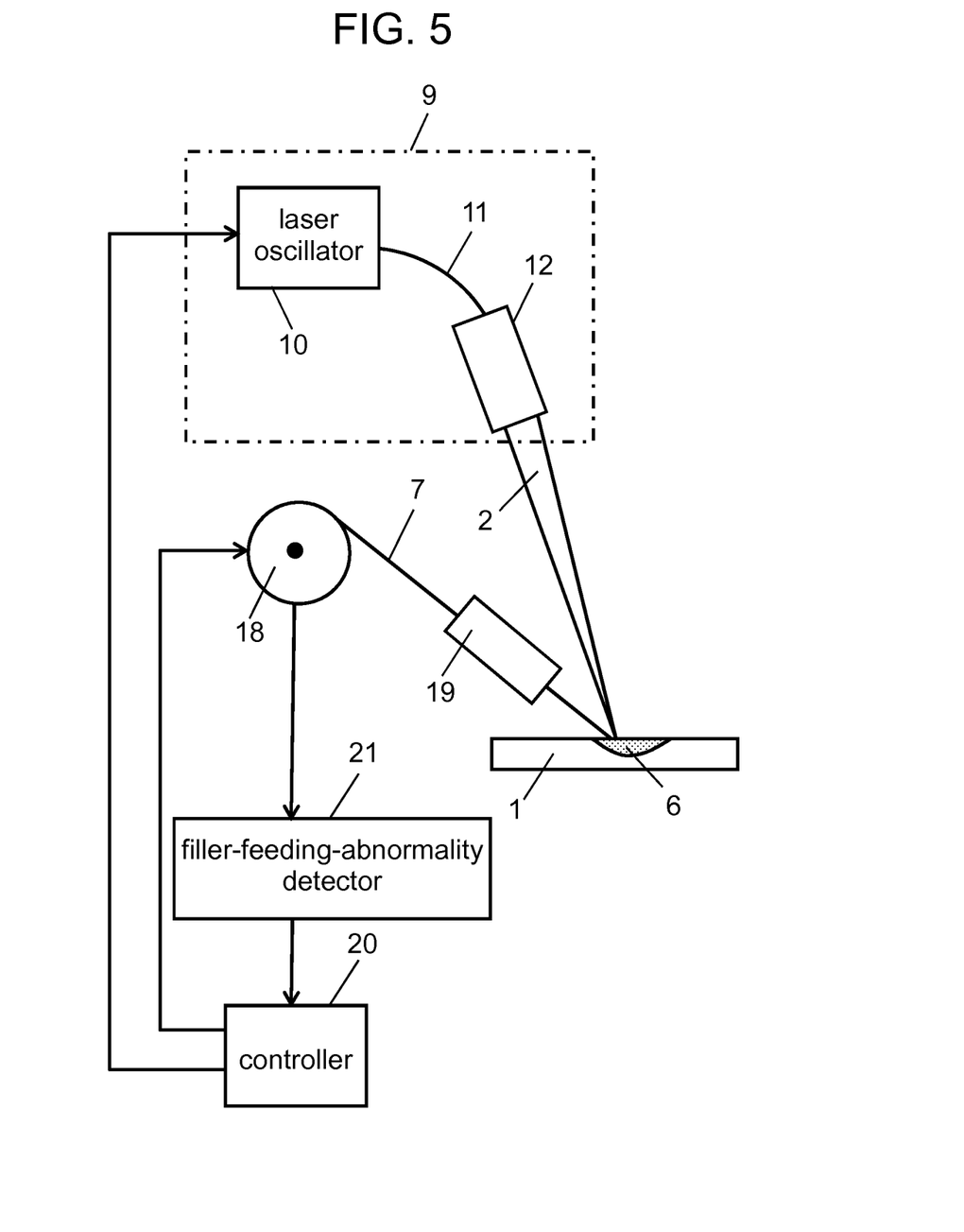
FIG. 5 is a schematic diagram of a laser welding apparatus according to a second exemplary embodiment of the present invention.

FIG. 5 is a schematic diagram of a laser welding apparatus of a second exemplary embodiment of the present invention. This laser welding apparatus differs from the laser welding apparatus of the first exemplary embodiment shown in FIG. 1 in not having arc generator 13, wire feeder 17, and torch 16. The other components have the same operations and effects as in the apparatus shown in FIG. 1, and are denoted by the same reference numerals. The description of these components will be omitted.

The laser welding apparatus of the present invention includes laser generator 9, filler feeder 18, filler-feeding-abnormality detector 21, and controller 20. Controller 20 is configured to stop welding immediately upon receiving the filler-feeding-abnormality signal from filler-feeding-abnormality detector 21. Laser generator 9 applies laser beam 2 to the welding position of object 1 to be welded. Filler feeder 18 feeds filler 7 to the welding position through torch 19. Controller 20 receives the output signal of filler-feeding-abnormality detector 21, and controls laser generator 9 and filler feeder 18.

This structure can stop welding before the formation of a weld bead having an undesired shape, thus providing excellent welding performance and also preventing the breakage of the welding apparatus.

As described above, according to the laser welding apparatus of the second exemplary embodiment, a laser beam is applied to the welding position of the object to be welded, and at the same time, a filler is fed to the welding position. If an abnormality is detected in the feeding of the filler, welding is immediately stopped. This can stop welding before the formation of a weld bead having an undesired shape, and also prevent the breakage of the welding apparatus.

Third Exemplary Embodiment

Figure 6:
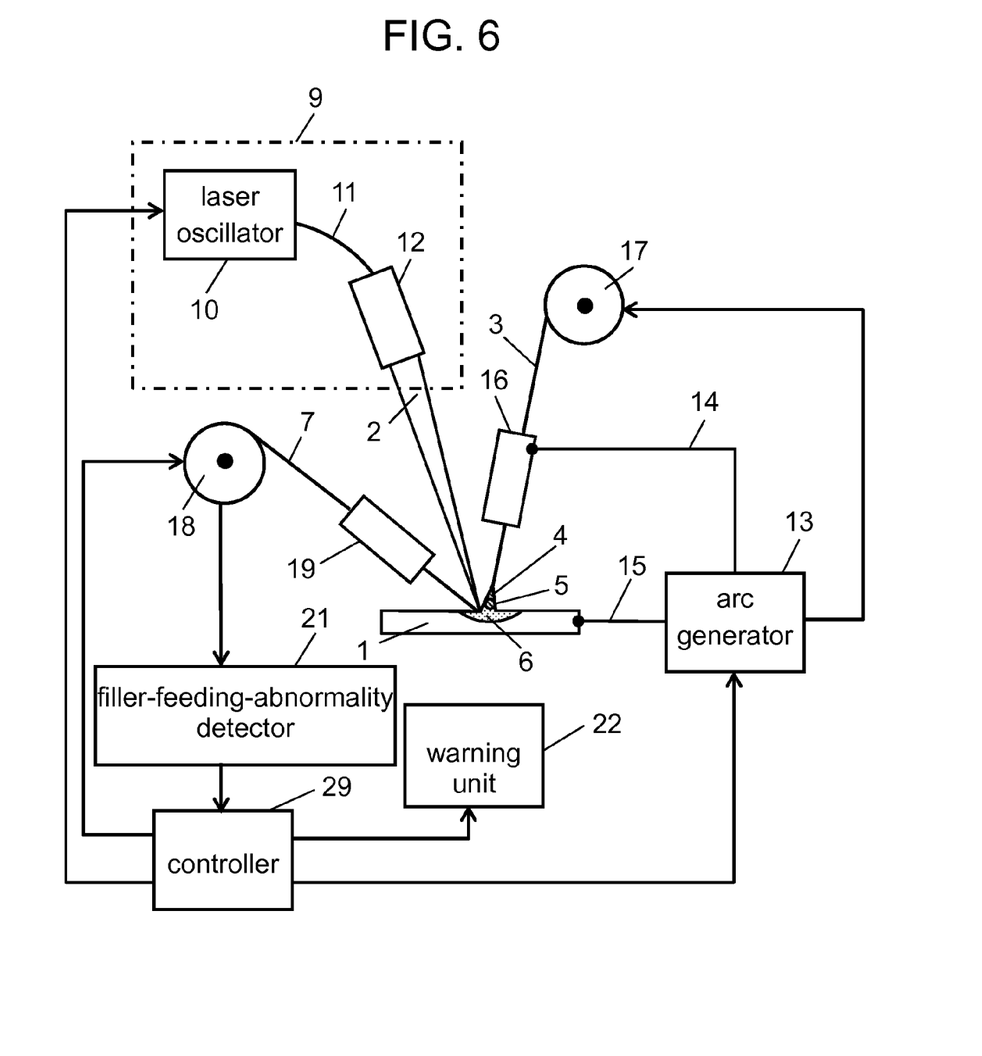
FIG. 6 is a schematic diagram of a laser welding apparatus according to a third exemplary embodiment of the present invention.

FIG. 6 is a schematic diagram of a laser welding apparatus according to a third exemplary embodiment of the present invention. This laser welding apparatus includes warning unit 22 and controller 29 instead of controller 20 used in the first exemplary embodiment shown in FIG. 1. Controller 29 outputs a warning signal to warning unit 22.

Controller 29 receives a signal from filler-feeding-abnormality detector 21, and controls laser generator 9, arc generator 13, and filler feeder 18. Warning unit 22 receives the warning signal from controller 29, and informs the user that the laser welding apparatus is in an abnormal condition. Controller 29 has the same functions as controller 20 of the first exemplary embodiment except for outputting the warning signal to warning unit 22.

The following is a description of the operation of the laser welding apparatus according to the third exemplary embodiment. Until receiving the filler-feeding-abnormality signal from filler-feeding-abnormality detector 21, controller 29 controls laser generator 9, arc generator 13, and filler feeder 18 so as to perform hybrid laser-arc welding. Immediately upon receiving the filler-feeding-abnormality signal from filler-feeding-abnormality detector 21, controller 29 outputs the warning signal to warning unit 22, and stops the feeding of filler 7. At the same time, controller 29 controls laser generator 9 and arc generator 13 so as to stop laser welding. Upon receiving the warning signal, warning unit 22 informs the user that the welding apparatus is in an abnormal condition by, for example, making a sound or lighting an indicator light.

As described above, according to the laser welding apparatus of the third exemplary embodiment, a wire is fed to the welding position of an object to be welded while a laser beam is applied to the welding position, and at the same time, an arc is created between the wire and the welding position. The laser welding apparatus includes the laser generator, the wire feeder, the arc generator, the filler feeder, the filler-feeding-abnormality detector, and the controller. The controller reduces the feed speed of the filler by a predetermined level immediately upon receiving the filler-feeding-abnormality signal from the filler-feeding-abnormality detector. If an abnormality is detected in the feeding of the filler to the welding position, the warning signal is immediately outputted to stop welding.

This structure can stop welding before the formation of a weld bead having an undesired shape, and also prevent the breakage of the welding apparatus.

The method of the present invention for laser welding in which a filler is fed to the welding position of the object to be welded while a laser beam is applied to the welding position includes: a detecting step and a speed reducing step. The detecting step detects an abnormality in the feeding of the filler; and the speed reducing step reduces the feed speed of the filler by a predetermined level immediately after the detecting step.

This method can stop welding before the formation of a weld bead having an undesired shape, thus providing excellent welding performance and also preventing the breakage of the welding apparatus.

The method for laser welding may further include a warning issuing step to issue a warning immediately after the detecting step. This method can stop welding before the formation of a defective weld bead, and also prevent the breakage of the welding apparatus.

In the laser welding apparatuses of the first to third exemplary embodiments, torch 19 used to feed filler 7 may be the same type as torch 16 used to feed wire 3. Filler 7 may be disposed either so as to be exposed directly to laser beam 2, or so as to be in contact with object 1 to be welded and also to be exposed directly to laser beam 2.

In the laser welding apparatuses of the first to third exemplary embodiments, controller 20 and controller 29 may perform one of the following five options upon receiving the filler-feeding-abnormality signal from filler-feeding-abnormality detector 21. The first option is to reduce the feed speed of filler 7 immediately by a predetermined level. The second option is to reduce the feed speed of filler 7 by the predetermined level only for a predetermined period, and then to feed filler 7 at the original speed. The third option is to feed a predetermined amount of filler 7 in the reverse direction first, and then to feed filler 7 in the forward direction. The fourth option is to feed a predetermined amount of filler 7 in the reverse direction first, and then to feed filler 7 at a predetermined lower feed speed. The fifth option is to stop the feeding of filler 7.

According to the laser welding apparatus of the present invention, the controller may reduce the feed speed of the filler by a predetermined level for a predetermined period immediately upon receiving the filler-feeding-abnormality signal from the filler-feeding-abnormality detector, and then feed the filler at the original speed.

This structure can stop welding before the formation of a defective weld bead, and also prevent the breakage of the welding apparatus.

In the method of the present invention for laser welding, the speed reducing step may include a feeding step to reduce the feed speed of the filler by a predetermined level for a predetermined period immediately after the detecting step, and then feeding the filler at the original speed.

This method can stop welding before the formation of a defective weld bead, and also prevent the breakage of the welding apparatus.

Figure 7A:
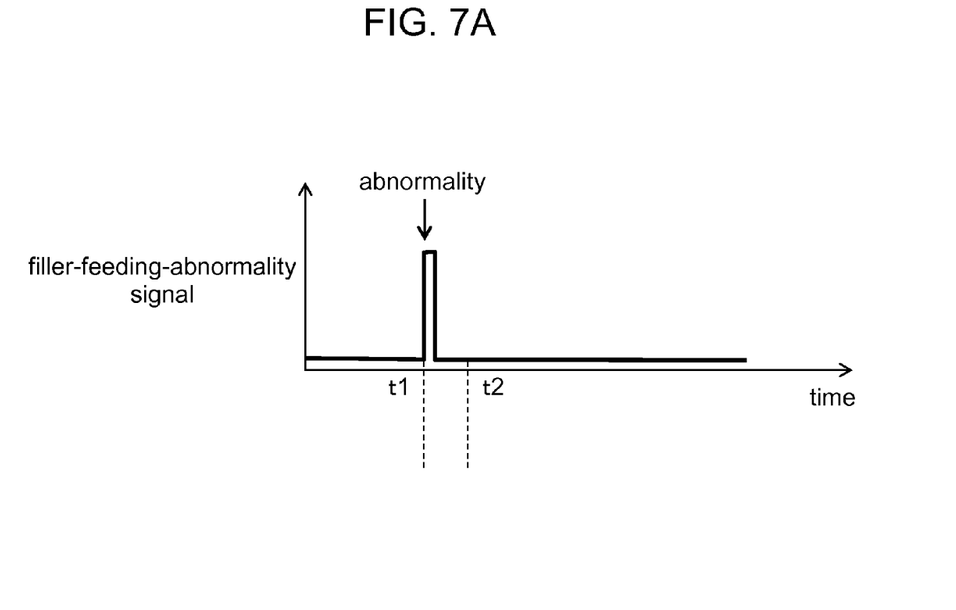
FIG. 7A is a schematic diagram showing the generation of a filler-feeding-abnormality signal.
Figure 7B:
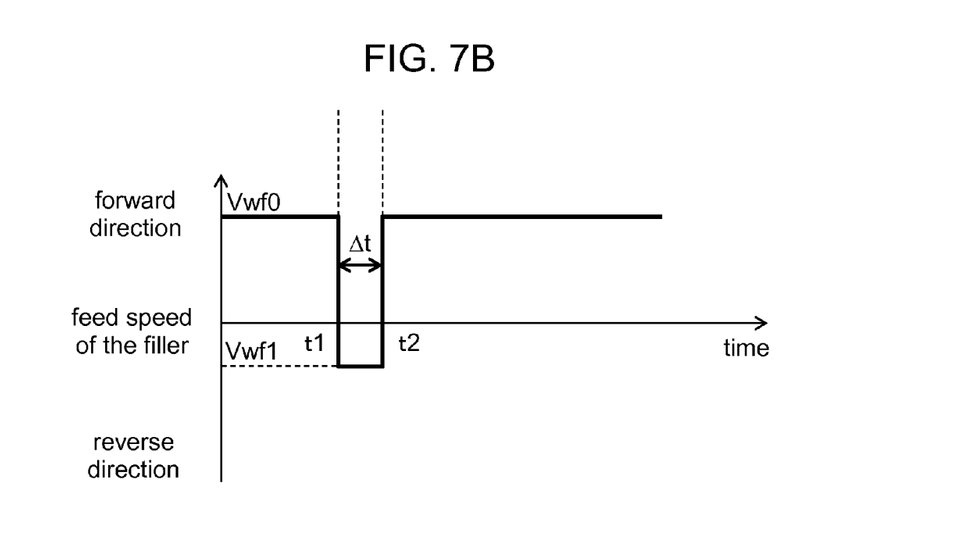
FIG. 7B is a schematic diagram showing changes in the feed speed of the filler in response to the generation of the filler-feeding-abnormality signal.

The following is a detailed description, with reference to the schematic diagrams of FIGS. 7A and 7B, of how a predetermined amount of filler 7 is fed in the reverse direction, and then filler 7 is fed in the forward direction. The detailed description of the other methods will be omitted.

FIG. 7A is a schematic diagram showing the generation of a filler-feeding-abnormality signal. FIG. 7B is a schematic diagram showing changes in the feed speed of the filler in response to the generation of the filler-feeding-abnormality signal. The filler-feeding-abnormality signal starts at a timing t1. Between a time 0 and the time t1, filler 7 is fed at a speed of Vwf0. For a predetermined period Δt from the time t1 to a time t2, a predetermined amount of filler 7 is fed in the reverse direction (the product of Vwf1 and Δt has to be constant). From time t2 onward, filler 7 is again fed in the forward direction at a speed of Vwf0. In the drawings, Vwf0 and Vwf1 have different values, but it goes without saying that it is possible to make Vwf0=Vwf1.

The method of the present invention for laser welding may alternatively include: a detecting step to detect an abnormality in the feeding of the filler; a reverse-direction feeding step to feed a predetermined amount of the filler in a reverse direction immediately after the detecting step; and a forward-direction feeding step to feed the filler in a forward direction after the reverse-direction feeding step.

This method can stop welding before the formation of a defective weld bead, and also prevent the breakage of the welding apparatus.

The method of the present invention for laser welding may alternatively include: a detecting step to detect an abnormality in the feeding of the filler; a reverse-direction feeding step to feed a predetermined amount of the filler in a reverse direction immediately after the detecting step; and a low-speed feeding step to feed the filler at a speed reduced by a predetermined level.

This method can stop welding before the formation of a defective weld bead, and also prevent the breakage of the welding apparatus.

In the laser welding apparatus of the present invention, the controller may feed a predetermined amount of the filler in a reverse direction immediately upon receiving a filler-feeding-abnormality signal from the filler-feeding-abnormality detector, and then feed the filler in a forward direction.

This structure can stop welding before the formation of a defective weld bead, and also prevent the breakage of the welding apparatus.

The controller may feed a predetermined amount of the filler in a reverse direction immediately upon receiving a filler-feeding-abnormality signal from the filler-feeding-abnormality detector, and then feeds the filler at a speed reduced by a predetermined level.

This structure can stop welding before the formation of a defective weld bead, and also prevent the breakage of the welding apparatus.

The laser welding apparatus of the present invention may alternatively include a laser generator, a filler feeder, a filler-feeding-abnormality detector, and a controller. The controller may reduce the feed speed of the filler by a predetermined level immediately upon receiving a filler-feeding-abnormality signal from the filler-feeding-abnormality detector. The laser generator applies a laser beam to the welding position of an object to be welded. The filler feeder feeds a filler through a torch to the welding position. The filler-feeding-abnormality detector detects a filler-feeding-abnormality timing of the filler feeder. The controller receives the output signal of the filler-feeding-abnormality detector, and controls the laser generator and the filler feeder.

This structure can stop welding before the formation of a defective weld bead, and also prevent the breakage of the welding apparatus.

In the laser welding apparatus of the present invention, the controller may reduce the feed speed of the filler by a predetermined level for a predetermined period immediately upon receiving a filler-feeding-abnormality signal from the filler-feeding-abnormality detector, and then feed the filler at the original speed.

This structure can stop welding before the formation of a defective weld bead, and also prevent the breakage of the welding apparatus.

The controller may feed a predetermined amount of the filler in a reverse direction immediately upon receiving a filler-feeding-abnormality signal from the filler-feeding-abnormality detector, and then feed the filler in a forward direction.

This structure can stop welding before the formation of a defective weld bead, and also prevent the breakage of the welding apparatus.

The controller may feed a predetermined amount of the filler in a reverse direction immediately upon receiving a filler-feeding-abnormality signal from the filler-feeding-abnormality detector, and then feed the filler at a speed reduced by a predetermined level.

This structure can stop welding before the formation of a defective weld bead, and also prevent the breakage of the welding apparatus.

INDUSTRIAL APPLICABILITY

As described hereinbefore, according to the method and apparatus for laser welding of the present invention, a wire is fed to the welding position of an object to be welded while a laser beam is applied to the welding position, and at the same time, an arc is created between the wire and the welding position. If an abnormality is detected in the feeding of the filler to the welding position, welding is immediately stopped. This can stop welding before the formation of a weld bead having an undesired shape, and also prevent the breakage of the welding apparatus. The method and apparatus for laser welding are industrially very useful.

REFERENCE MARKS IN THE DRAWINGS

1 object to be welded
2 laser beam
3 wire
4 arc
5 droplet
6 molten weld pool
7 filler
8 bead
9 laser generator
10 laser oscillator
11 laser transmitter
12 light collection optical system
13 arc generator
14, 15 cable 16, 19 torch
17 wire feeder
18 filler feeder
20, 29 controller
21 filler-feeding-abnormality detector
22 warning unit
23, 28 calculator
24, 25 reference value setting unit
26 differential unit
27 signal exclusion timing generator

The invention claimed is:

1. A method for laser welding in which a filler is fed to a welding position of an object to be welded while a laser beam is applied to the welding position, the method comprising:
   a detecting step to detect an abnormality in feeding of the filler; and
   a filler-feed stopping step to stop the feeding of the filler immediately after the detecting step.

2. The method of claim 1, wherein
   welding is performed by applying a laser beam to the welding position of the object to be welded while feeding a wire to the welding position, and at a same time, creating an arc between the wire and the welding position.

3. The method of claim 1, further comprising:
   a warning issuing step to issue a warning immediately after the detecting step.

4. The method of claim 1, wherein
   the filler is disposed so as to be exposed directly to the laser beam.

5. The method of claim 1, wherein
   the filler is disposed so as to be in contact with the object to be welded and also to be exposed directly to the laser beam.

6. The method of claim 1, further comprising:
   a laser beam stopping step to stop the laser beam immediately after the detecting step.

7. The method of claim 6, wherein
   welding is performed by applying a laser beam to the welding position of the object to be welded while feeding a wire to the welding position, and at a same time, creating an arc between the wire and the welding position.

8. The method of claim 6, further comprising:
   a warning issuing step to issue a warning immediately after the detecting step.

9. The method of claim 6, wherein
   the filler is disposed so as to be exposed directly to the laser beam.

10. The method of claim 6, wherein
    the filler is disposed so as to be in contact with the object to be welded and also to be exposed directly to the laser beam.

11. A laser welding apparatus comprising:
    a laser generator to apply a laser beam to a welding position of an object to be welded;
    a filler feeder to feed a filler through a first torch to the welding position;
    a filler-feeding-abnormality detector to detect an abnormality in feeding of the filler performed by the filler feeder; and
    a controller to receive an output signal of the filler-feeding-abnormality detector and control the laser generator and the filler feeder, wherein
    the controller stops the feeding of the filler immediately upon receiving a filler-feeding-abnormality signal from the filler-feeding-abnormality detector.

12. The laser welding apparatus of claim 11, wherein
    the filler-feeding-abnormality detector receives a drive current of a filler-feed motor of the filler feeder, and outputs the filler-feeding-abnormality signal to the controller when the drive current exceeds a predetermined reference value.

13. The laser welding apparatus of claim 11, wherein
    the filler-feeding-abnormality detector receives a drive current of a filler-feed motor of the filler feeder, and outputs the filler-feeding-abnormality signal to the controller when a differential of the drive current exceeds a reference value.

14. The laser welding apparatus of claim 11, wherein
    the filler-feeding-abnormality detector receives an output signal of a force sensor, and outputs the filler-feeding-abnormality signal to the controller when the output signal exceeds a reference value, the force sensor being attached to either the torch used to feed the filler or a fastener for fixing the torch, and detecting a load applied to the torch.

15. The laser welding apparatus of claim 11, wherein
    the filler-feeding-abnormality detector receives an output signal of a force sensor, and outputs the wire-feeding-abnormality signal to the controller when a differential of the output signal exceeds a reference value, the force sensor being attached to either the torch used to feed the filler or a fastener for fixing the torch, and detecting a load applied to the torch.

16. The laser welding apparatus of claim 11, wherein
    the filler-feeding-abnormality detector does not output the abnormality signal only for a predetermined period after welding is started.

17. The laser welding apparatus of claim 11, wherein
    the filler-feeding-abnormality detector does not output the abnormality signal only for a predetermined period from a time point at which the feed speed of the filler is adjusted.

18. The laser welding apparatus of claim 11, further comprising:
    a wire feeder to feed a wire through a second torch to the welding position; and
    an arc generator to control the wire feeder and supply electric power for creating an arc between the wire and the object to be welded, wherein
    the controller controls the arc generator.

19. The laser welding apparatus of claim 18, wherein
    the first torch is a same type as the second torch.

20. The laser welding apparatus of claim 18, wherein
    the filler-feeding-abnormality detector receives a drive current of a filler-feed motor of the filler feeder, and outputs the filler-feeding-abnormality signal to the controller when the drive current exceeds a predetermined reference value.

21. The laser welding apparatus of claim 18, wherein
    the filler-feeding-abnormality detector receives a drive current of a filler-feed motor of the filler feeder, and outputs the filler-feeding-abnormality signal to the controller when a differential of the drive current exceeds a reference value.

22. The laser welding apparatus of claim 18, wherein
    the filler-feeding-abnormality detector receives an output signal of a force sensor, and outputs the filler-feeding-abnormality signal to the controller when the output signal exceeds a reference value, the force sensor being attached to either the torch used to feed the filler or a fastener for fixing the torch, and detecting a load applied to the torch.

23. The laser welding apparatus of claim 18, wherein
the filler-feeding-abnormality detector receives an output signal of a force sensor, and outputs the wire-feeding-abnormality signal to the controller when a differential of the output signal exceeds a reference value, the force sensor being attached to either the torch used to feed the filler or a fastener for fixing the torch, and detecting a load applied to the torch.

24. The laser welding apparatus of claim 18, wherein
the filler-feeding-abnormality detector does not output the abnormality signal only for a predetermined period after welding is started.

25. The laser welding apparatus of claim 18, wherein
the filler-feeding-abnormality detector does not output the abnormality signal only for a predetermined period from a time point at which the feed speed of the filler is adjusted.

26. The laser welding apparatus of claim 18, wherein
the controller outputs a warning signal to a warning unit immediately upon receiving the filler-feeding-abnormality signal from the filler-feeding-abnormality detector.

27. The laser welding apparatus of claim 18, wherein
the filler is disposed so as to be exposed directly to the laser beam.

28. The laser welding apparatus of claim 18, wherein
the filler is disposed so as to be in contact with the object to be welded and also to be exposed directly to the laser beam.

29. The laser welding apparatus of claim 11, wherein
the controller stops the laser beam immediately upon receiving a filler-feeding-abnormality signal from the filler-feeding-abnormality detector.

30. The laser welding apparatus of claim 29, wherein
the filler-feeding-abnormality detector receives a drive current of a filler-feed motor of the filler feeder, and outputs the filler-feeding-abnormality signal to the controller when the drive current exceeds a predetermined reference value.

31. The laser welding apparatus of claim 29, wherein
the filler-feeding-abnormality detector receives a drive current of a filler-feed motor of the filler feeder, and outputs the filler-feeding-abnormality signal to the controller when a differential of the drive current exceeds a reference value.

32. The laser welding apparatus of claim 29, wherein
the filler-feeding-abnormality detector receives an output signal of a force sensor, and outputs the filler-feeding-abnormality signal to the controller when the output signal exceeds a reference value, the force sensor being attached to either the torch used to feed the filler or a fastener for fixing the torch, and detecting a load applied to the torch.

33. The laser welding apparatus of claim 29, wherein
the filler-feeding-abnormality detector receives an output signal of a force sensor, and outputs the wire-feeding-abnormality signal to the controller when a differential of the output signal exceeds a reference value, the force sensor being attached to either the torch used to feed the filler or a fastener for fixing the torch, and detecting a load applied to the torch.

34. The laser welding apparatus of claim 29, wherein
the filler-feeding-abnormality detector does not output the abnormality signal only for a predetermined period after welding is started.

35. The laser welding apparatus of claim 29, wherein
the filler-feeding-abnormality detector does not output the abnormality signal only for a predetermined period from a time point at which the feed speed of the filler is adjusted.

36. The laser welding apparatus of claim 29, further comprising:
a wire feeder to feed a wire through a second torch to the welding position; and
an arc generator to control the wire feeder and supply electric power for creating an arc between the wire and the object to be welded, wherein
the controller controls the arc generator.

37. The laser welding apparatus of claim 36, wherein
the first torch is a same type as the second torch.

* * * * *